United States Patent
Chu et al.

(10) Patent No.: US 8,254,334 B2
(45) Date of Patent: Aug. 28, 2012

(54) OPTIMIZATION METHOD OF MULTIPLE SERVICE FLOWS OPERATION FOR WIMAX SYSTEM

(75) Inventors: Li Chu, Shenzhen (CN); Jianquan Song, Shenzhen (CN); Ling Xu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 355 days.

(21) Appl. No.: 12/744,307

(22) PCT Filed: Nov. 21, 2008

(86) PCT No.: PCT/CN2008/073156
§ 371 (c)(1),
(2), (4) Date: May 21, 2010

(87) PCT Pub. No.: WO2009/076822
PCT Pub. Date: Jun. 25, 2009

(65) Prior Publication Data
US 2010/0284369 A1    Nov. 11, 2010

(30) Foreign Application Priority Data
Nov. 23, 2007   (CN) .......................... 2007 1 0187727

(51) Int. Cl.
*H04W 4/00*    (2009.01)

(52) U.S. Cl. ...................................................... 370/331

(58) Field of Classification Search .................. 370/203, 370/204–215, 229–240, 310–337, 338–350, 370/351–394, 395.1, 395.3, 395.4, 395.41, 370/395.42, 395.5, 395.52, 395.53, 412–421, 370/431–457, 458–463, 464–497, 498–529
See application file for complete search history.

(56) References Cited

U.S. PATENT DOCUMENTS
7,809,381 B2 * 10/2010 Aborn et al. ............... 455/456.5
(Continued)

FOREIGN PATENT DOCUMENTS
CN    1845527 A    10/2006
(Continued)

OTHER PUBLICATIONS
International Search Report in international application No. PCT/CN2008/073156, mailed on Mar. 5, 2009.
(Continued)

*Primary Examiner* — Kwang B Yao
*Assistant Examiner* — Jung-Jen Liu
(74) *Attorney, Agent, or Firm* — Oppedahl Patent Law Firm LLC (57) ABSTRACT

An optimization method of multiple service flows operation for a WiMAX system includes: adding a resource combination indication to a hand-off request message, a path pre-registration request message and a path registration request message; hand-off request processing: when multiple service flows are handed off by a mobile station from a current serving network to a target network, determining whether the mobile station is allowed to hand off to a target network according to the resource combination indication in the hand-off request message and whether the handoff of the multiple service flows is accepted by the target network; path pre-establishment processing and path establishment processing: when the mobile station is allowed to hand off multiple service flows from the current serving network to the target network, determining whether data paths between the target network and the network where a data management unit is located can be pre-established/established according to the resource combination indication in the path pre-registration request message and the path registration request message and whether the data path pre-registration/registration of the multiple service flows can be established.

29 Claims, 4 Drawing Sheets

U.S. PATENT DOCUMENTS

| | | | |
|---|---|---|---|
| 7,852,817 B2 * | 12/2010 | Gallagher et al. | 370/338 |
| 7,912,004 B2 * | 3/2011 | Gallagher et al. | 370/329 |
| 7,957,348 B1 * | 6/2011 | Gallagher et al. | 370/331 |
| 8,005,076 B2 * | 8/2011 | Gallagher et al. | 370/353 |
| 8,041,335 B2 * | 10/2011 | Khetawat et al. | 455/404.2 |
| 8,045,525 B1 * | 10/2011 | Bontu et al. | 370/331 |
| 8,064,948 B2 * | 11/2011 | Meier et al. | 455/552.1 |
| 8,149,790 B2 * | 4/2012 | Purkayastha et al. | 370/332 |
| 8,165,091 B2 * | 4/2012 | Nix | 370/331 |
| 8,165,574 B2 * | 4/2012 | Hallenstal et al. | 455/418 |
| 2004/0085957 A1 * | 5/2004 | Verma | 370/389 |
| 2006/0099949 A1 * | 5/2006 | Jung et al. | 455/436 |
| 2007/0160017 A1 * | 7/2007 | Meier et al. | 370/338 |
| 2007/0165709 A1 | 7/2007 | Walker et al. | |
| 2009/0262682 A1 * | 10/2009 | Khetawat et al. | 370/328 |
| 2009/0262683 A1 * | 10/2009 | Khetawat et al. | 370/328 |
| 2009/0262684 A1 * | 10/2009 | Khetawat et al. | 370/328 |
| 2009/0262702 A1 * | 10/2009 | Khetawat et al. | 370/331 |
| 2009/0262703 A1 * | 10/2009 | Khetawat et al. | 370/331 |
| 2009/0262704 A1 * | 10/2009 | Khetawat et al. | 370/331 |
| 2009/0264095 A1 * | 10/2009 | Khetawat et al. | 455/404.2 |
| 2009/0264126 A1 * | 10/2009 | Khetawat et al. | 455/435.1 |
| 2009/0265542 A1 * | 10/2009 | Khetawat et al. | 713/151 |
| 2009/0265543 A1 * | 10/2009 | Khetawat et al. | 713/151 |
| 2010/0195621 A1 * | 8/2010 | Kekki et al. | 370/332 |
| 2010/0278145 A1 * | 11/2010 | Jabbari et al. | 370/331 |
| 2011/0149838 A1 * | 6/2011 | Gallagher et al. | 370/328 |
| 2012/0076121 A1 * | 3/2012 | Choi et al. | 370/338 |

FOREIGN PATENT DOCUMENTS

| | | |
|---|---|---|
| CN | 101043440 A | 9/2007 |
| JP | 2005006019 A | 1/2005 |
| JP | 2007527177 A | 9/2007 |
| WO | 2006128380 A1 | 12/2006 |
| WO | 2007042721 A1 | 4/2007 |
| WO | 2007114862 A2 | 10/2007 |
| WO | 2007130281 A2 | 11/2007 |

OTHER PUBLICATIONS

English Translation of the Written Opinion of the International Search Authority in international application No. PCT/CN2008/073156, mailed on Mar. 5, 2009.

Air Interface for Fixed and Mobile Broadband Wireless Access Systems Dec. 9, 2003.

* cited by examiner

OPTIMIZATION METHOD OF MULTIPLE SERVICE FLOWS OPERATION FOR WIMAX SYSTEM

TECHNICAL FIELD

The present invention relates to the field of communications, and particularly relates to an optimization method of multiple service flows operation for a worldwide interoperability for microwave access (WiMAX) system.

BACKGROUND

In a WiMAX wireless communication system, service of multiple service flows may be provided for one user at the same time. The WiMAX allows operation requests of multiple service flows to be included in one message. In a network working group (NWG for short, which is one of the working groups of WiMAX standard organization and responsible for the work relating to network technologies of the WiMAX system) standard, a resource combination indication field may be included in a message to indicate whether operation results of multiple service flows in a same request message are bound. If multiple service flows are bound, then failure of any service flow will result in the failure of scheduled operation of all service flows in the entire request message; if the multiple service flows are not bound, then the failure of any service flow will only affect its own scheduled result; if there is no resource combination indication field, then the default is that the multiple service flows are not bound.

During a hand-off process, multiple service flows processing may be involved in one message. In the current NWG standard, the definition of a hand-off request message does not contain the resource combination indication, which may result in the loss of original service flow binding information after a mobile station (MS) executes a handoff. Under the situation that the service flow binding information is lost, if it is required to acquire the lost information again, then corresponding processing will be needed. This will increase signaling traffic.

Figure 1:
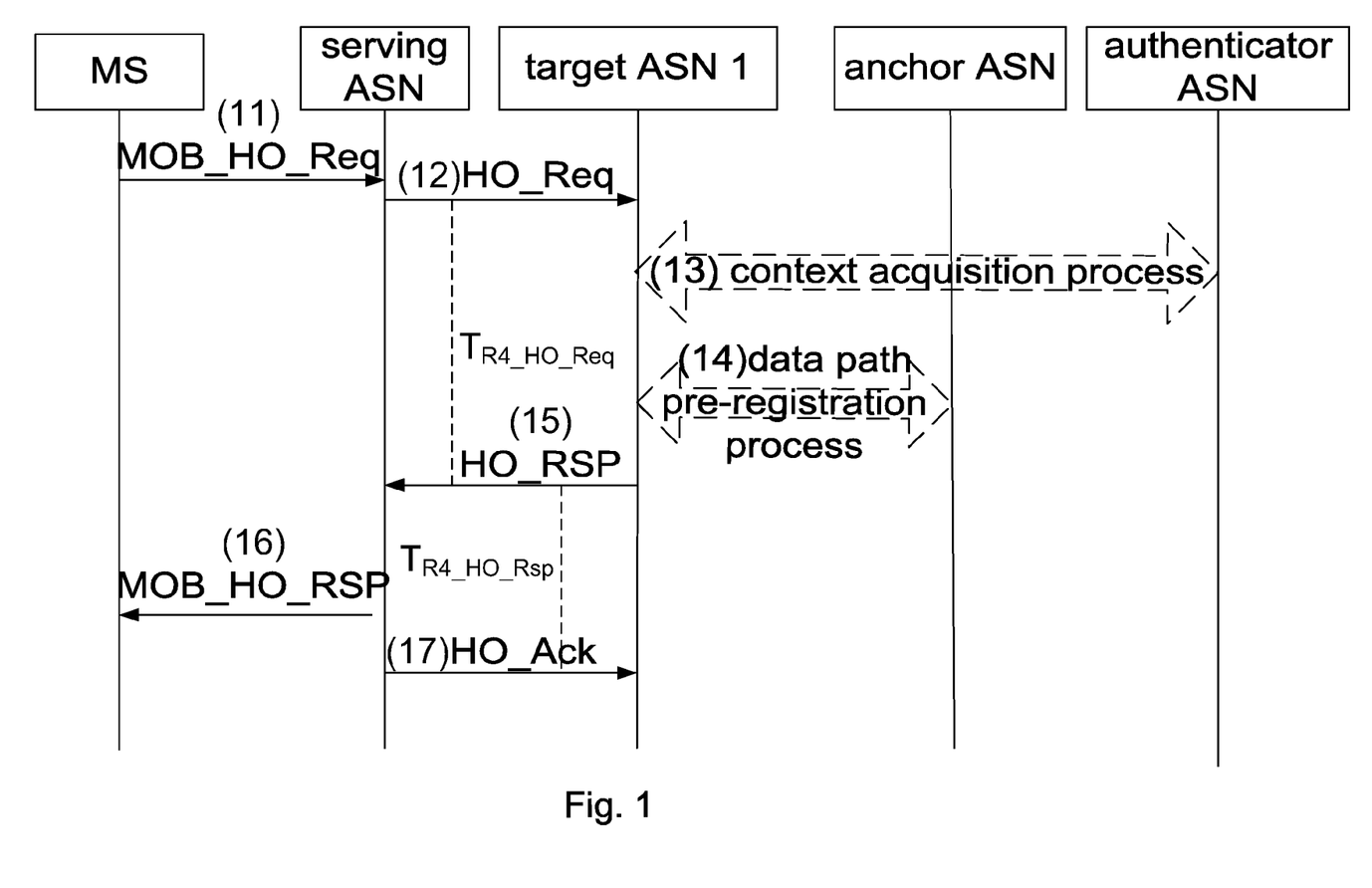
FIG. 1 is a signaling flow chart of processing in a hand-off preparation stage according to related art.

FIG. 1 is a signaling flow chart of processing in a hand-off preparation stage during a handoff in a prior art. As shown in FIG. 1, the hand-off scenario is that (a target network) initiates authentication key (AK) context acquisition and data path pre-registration initiated by target network. FIG. 1 only illustrates the flow of a handoff to target Network 1 for easy understanding and description. It can be easily thought of that there might be a plurality of target networks in an actual process.

As shown in FIG. 1, the processing in a hand-off preparation stage may include the following steps (step 11-step 17):

step 11: an MS sends an MOB_MSHO-REQ (interface hand-off request) message to a serving ASN (current serving network) to initiate a handoff;

step 12: the serving ASN sends an HO_Req (hand-off request) message to one or a plurality of target networks; this message includes an authenticator ID and an anchor ASN GW ID (anchor network gateway ID);

step 13: target ASN 1 (target Network 1) initiates a context request flow to an authenticator ASN (authenticator network), in actual implementation, the initiation of the step 13 may be deferred to a hand-off action stage;

step 14: the target ASN 1 (target Network 1) or an anchor ASN (a network where a data management unit is located) initiates a data path pre-establishment flow, in actual implementation, the initiation of the step 14 may be deferred to a hand-off action stage;

step 15: the target ASN 1 sends an HO_Rsp (hand-off response) message to the serving ASN in response to the HO_Req;

step 16: the serving ASN sends an MOB_BSHO-RSP (interface hand-off response) message to the MS, this message includes a potential target BS (target base station) that is selected by one or a plurality of networks for the MS and can be handed off to; and step 17: the serving ASN sends an HO_Ack (hand-off acknowledgement response) to the target ASN 1 to which the potential target BS belongs.

Further, if there was a binding relationship among multiple service flows of the MS originally, after the MS is handed off from ASN a to ASN b, the default of the ASN b will be that the multiple service flows of the MS are not bound, for the previous hand-off message did not transfer information about the binding of the multiple service flows of the MS to the ASN b, thus it is possible to result in the loss of the information about the binding of the multiple service flows of the MS after the handoff takes place.

Therefore, according to the prior art, when the MS hands off to the target network again in the ASN b, the executed processing will be the same as the processing shown in FIG. 1, the only difference is that the ASN b will be changed into corresponding serving ASN.

Further, the resource combination indication filed is not contained in the Path_Prereg_Req (path pre-registration request)/Path_Reg_Req (path registration request) message defined by the existing NWG, with regard to the operation request of multiple service flows, it can not be guaranteed that the original service flow binding information is integrally transferred after the handoff. That is not good for the optimization of the target network judging on the multiple service flows.

Figure 2:
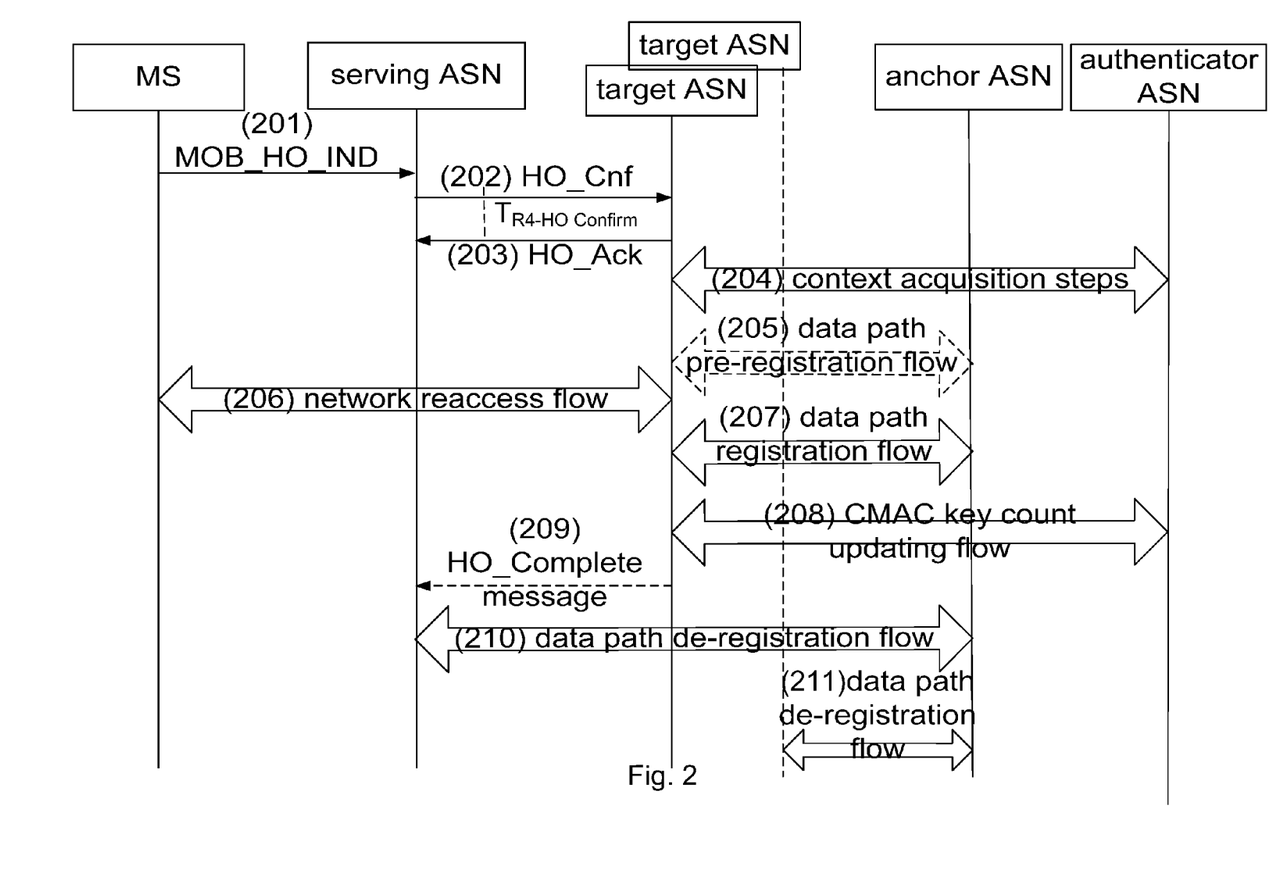
FIG. 2 is a signaling flow chart of processing in a hand-off action stage according to related art.

FIG. 2 is a signaling flow chart of processing in a hand-off action stage during a handoff in a prior art. As shown in FIG. 2, the serving ASN sends an HO_Cnf (hand-off confirm) message to the target ASN. The processing in the HO action stage may include the following steps (step 201-step 211):

step 201: according to a protocol, the MS sends an MOB_HO-IND (interface hand-off indication) message to the serving ASN to inform it that one of the target ASNs selected by the serving ASN has been handed off;

step 202: after the serving ASN receives the MOB_HO-IND message, it will send an HO_Cnf message to the target ASN selected in the previous step;

step 203: the target ASN selected above sends an HO_Ack message to the serving ASN;

step 204: if the HO_Req or the HO_Cnf message contains the authenticator ID and the authentication key (AK) context of the corresponding MS is not acquired in the previous hand-off preparation stage, then the target ASN selected above will initiate a context request flow to an authenticator ASN (a network where an authenticator is located) and requests the AK context for the MS;

step 205: if the HO_Req or HO_Cnf message contains an anchor ASN GW ID (anchor network gateway ID) field and the data path pre-registration flow has not started, then the flow may start in this step; if the data path pre-registration flow has started and SF Info (service flow information) in the Path_Prereg_Req and response messages includes data delivery trigger, then the distribution of any service flow of the MS will be triggered at once;

step 206: the MS initiates a flow of reaccessing the target ASN selected above;

step 207: the target ASN selected above initiates the data path registration flow to the anchor ASN;

step 208: after the network reaccess is completed with success, the target ASN selected above will initiate a cipher-based message authentication code key count (CMAC key count) updating flow;

step 209: after the network reaccess is completed with success, the target ASN selected above may send an HO_Complete (hand-off complete) message to the serving ASN to inform it of hand-off completion; and step 210-211: after data paths between the anchor ASN and the target ASN selected above is established, the anchor ASN may initiate a data path deregistration flow to the old serving ASN.

So far, no technical scheme that introduces optimization processing of multiple service flows binding relationship into a hand-off process has been proposed.

SUMMARY

The present invention is made in view of that no technical scheme that introduces optimization processing of multiple relationship flows binding relationship into a hand-off process has been proposed up till present, the main object of which is to provide an optimization method of multiple service flows operation for a WiMAX system. This method may provide an option for a target network that the target network can choose service flow binding operation during a handoff, thereby improving the processing of multiple service flows.

According to one aspect of the present invention, an optimization method of multiple service flows operation for a WiMAX system is provided.

This method includes: adding a resource combination indication to a handoff request message, a path pre-registration request message and a path registration request message, wherein the resource combination indication is used to indicate whether multiple service flows of a mobile station (MS) are bound with each other;

hand-off request processing: when the multiple service flows of the MS is handed off from a current serving network to a target network, the target network may determine whether the MS is allowed to hand off to a target network according to the resource combination indication in the hand-off request message and whether the handoff of the multiple service flows is accepted by the target network;

path pre-establishment processing: when it is allowed to hand off the multiple service flows of the MS from the current serving network to the target network, the target network or a network where a data management unit is located (anchor ASN) may determine whether data paths between the target network and the anchor ASN can be pre-established successfully according to the resource combination indication in the path pre-registration request message and the availability of establishing data path pre-registration of the multiple service flows; and path establishment processing: when it is allowed to hand off the multiple service flows of the MS from the current serving network to the target network and the path pre-registration processing is not performed, the anchor ASN may determine whether the data paths between the target network and the anchor ASN can be established successfully according to the resource combination indication in the path registration request message and the availability of establishing data path registration of the multiple service flows.

Wherein, in the hand-off request processing, it may further include: the MS initiates the handoff to the current serving network or the current serving network initiates the handoff; the current serving network sends the hand-off request message to the target network; when the resource combination indication in the hand-off request message indicates the multiple service flows of the MS are bound, if some of the multiple service flows are rejected by the target network, then the target network may determine that the MS is not allowed to hand off to the target network; if none of the multiple service flows is rejected by the target network, then the target network may determine that the MS is allowed to hand off to the target network. Moreover, when the MS is not allowed to hand off to the target network, it may further include: the target network sends a response message to the current serving network and the response message omits some information needed for subsequent handoff procedures; the current serving network informs the MS of the candidate target networks to which the handoff will be performed, wherein the candidate target networks do not include the target network that rejects the MS.

In addition, in the path pre-establishment processing, it may further include: the target network sends the path pre-registration request message to the anchor ASN, or the anchor ASN sends the path pre-registration request message to the target network; when the resource combination indication in the path pre-registration request message indicates the multiple service flows are bound with each other, if the network where a message receiver is located fails in processing the path pre-registration of some of the multiple service flows, then the target network or the anchor ASN will determine that the pre-establishment of the data paths between the target network and the anchor ASN is not allowed, and will terminate the path pre-establishment processing; if the path pre-registration of each of the multiple service flows is successfully established, then the pre-establishment of those data paths will be allowed.

In addition, in the path establishment processing, it may further include: the target network sends the path registration request message to the anchor ASN; when the resource combination indication in the path registration request message indicates the multiple service flows are bound with each other, as well as the path pre-registration is not performed, if the anchor ASN fails in processing the path registration of some of the multiple service flows, then it will determine that the establishment of the data paths between the target network and itself is not allowed, and will terminate the path establishment processing; if the path registration of each of the multiple service flows is successfully established, then establishment of the data paths between the target network and the anchor ASN is allowed.

Moreover, in this method, it may further include: the resource combination indication that indicates the binding relationship among the multiple service flows of the MS is transferred from the current serving network to the target network during the handoff.

And expressions for the resource combination indication may include at least one of the following: a resource combination indication ID and a service flow ID are used cooperatively; the multiple service flows in a binding relationship use the resource combination indications with a same ID; respective resource combination indications are set respectively in the information of each of the multiple service flows for the binding relationship.

Besides, if the resource combination indication in the hand-off request message, the path pre-registration request message and the path registration request message indicates the multiple service flows are not bound with each other, then the hand-off request processing, the path pre-establishment processing and the path establishment processing will be performed, next, multiple service flows processing will be triggered, wherein the resource combination indication includes a resource combination requirement and a convergence sublayer type. The convergence sublayer type is used to indicate the scope of the multiple service flows bound by the resource combination requirement, wherein the binding scope includes levels at MSs and service convergence sublayers.

According to another aspect of the present invention, an optimization method of multiple service flows operation for a WiMAX system is provided, including: adding multiple service flows binding indication information to a hand-off request message, a path pre-registration request message or a path registration request message, wherein the information is used to indicate whether multiple service flows of a MS are bound with each other; hand-off request processing: determining whether the MS is allowed to hand off to the target network according to the multiple service flows binding indication information in the hand-off request message and whether the handoff of the multiple service flows is accepted by the target network when the MS handed off from a current serving network to a target network; path pre-establishment processing: determining whether the data paths between the target network and a network where a data management unit is located (anchor ASN) can be pre-established according to the multiple service flows binding indication information in the path pre-registration request message and the availability of establishing data path pre-registration of the multiple service flows when it is allowed to hand off the multiple service flows of the MS from the current serving network to the target network; path establishment processing: determining whether the data paths between the target network and the anchor ASN can be established according to the multiple service flows binding indication information in the path registration request message and the availability of establishing data path registration of the multiple service flows when it is allowed to hand off the multiple service flows of the MS from the current serving network to the target network and the path pre-registration processing is not performed.

Through providing an assistance for the target network to make a judgement on the service flow operation, the foregoing technical scheme of the present invention overcomes the shortcomings of the prior art under the condition of multiple service flows, meanwhile, guarantees the integrity of the original service flow binding information after the MS hands off to the target network and avoids the errors of the multiple service flows processing that might arise therefrom.

DETAILED DESCRIPTION

Function Overview

Through sending information about whether multiple service flows are bound to a target network and providing an option for the target network to make a judgement on service flow binding operation, the technical scheme provided in the embodiments of the present invention guarantees the integrity of the original service flow binding information after a MS hands off to the target network and avoids errors of multiple service flows processing that might arise therefrom.

The present invention will be described in details hereinafter with reference to the drawings and the embodiments. It should be noted that the embodiments in this application and the features thereof may be combined with one another if no interference occurs.

Embodiment 1

Figure 3:
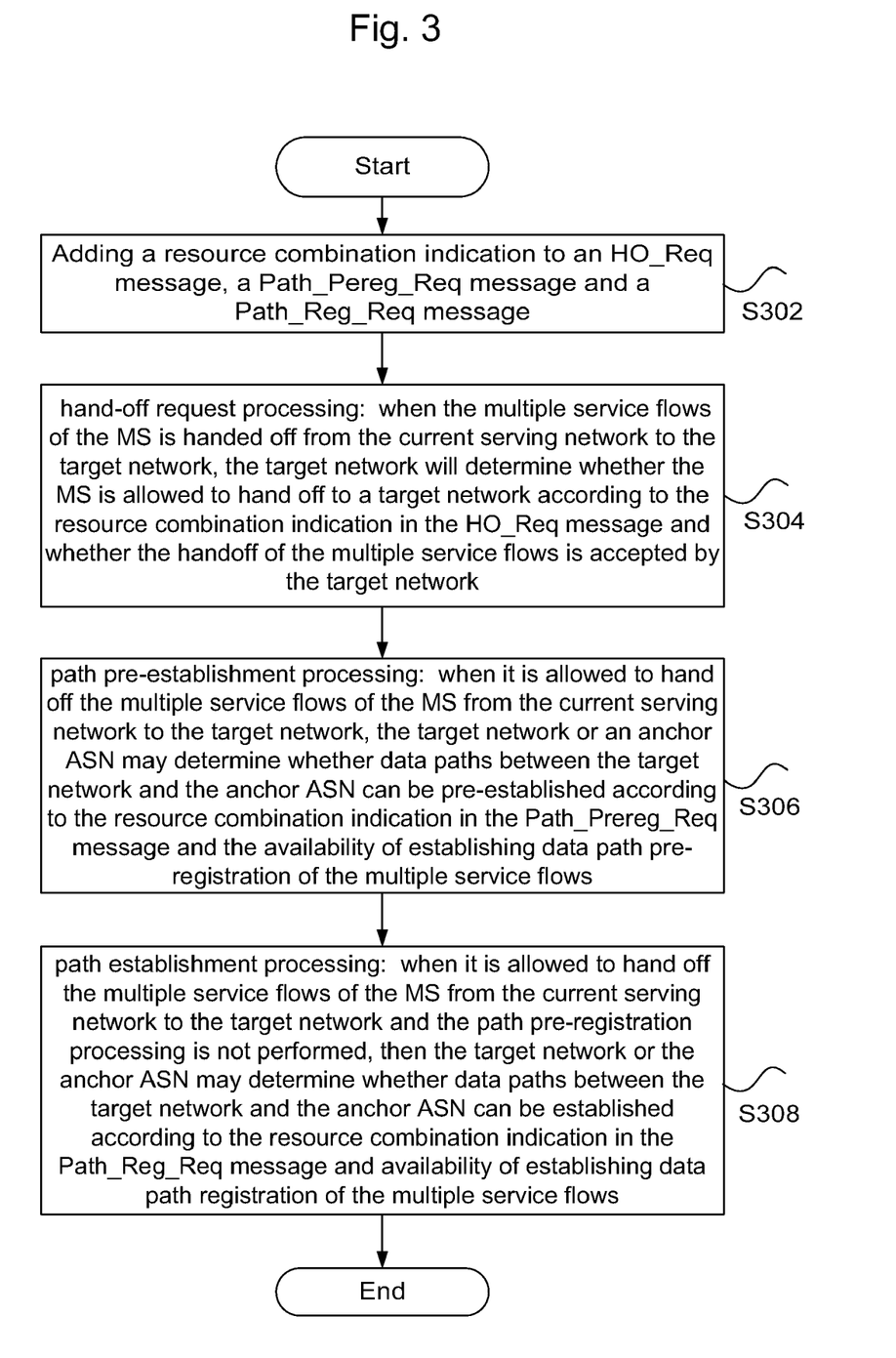
FIG. 3 is a flow chart of an optimization method of multiple service flows operation for a WiMAX system according to Embodiment 1 of the present invention.

In the embodiment of the present invention, an optimization method of multiple service flows operation for a WiMAX system is provided. FIG. 3 illustrates the optimization method of multiple service flows operation for a WiMAX system according to the embodiment of the present invention. As shown in FIG. 3, this method includes step S302-step S308, which will be described in details below.

Step S302: a resource combination indication is added to an HO_Req message, a Path_Prereg_Req message and a Path_Reg_Req message. The resource combination indication is used to indicate whether multiple service flows of a MS are bound with each other. The resource combination indication may include a resource combination requirement and a convergence sublayer type, where the resource combination requirement is used to identify whether the multiple service flows are bound. When it is identified that the multiple service flows are bound, it means that failure of any service flow will cause the following result: all requests for scheduled operations of all flows at this level under the requests are rejected; otherwise, when it is identified that the multiple service flows are not bound, it means that failure of a service flow only affects itself and will not affect operating results of other service flows under the requests. The convergence sublayer type is used to indicate the scope of the multiple service flows bound by the resource combination requirement. The binding scope includes: levels at MSs and service convergence sublayers.

If the resource combination indication in the HO_Req message, the Path_Prereg_Req message and the Path_Reg_Req message indicates the multiple service flows are not bound with each other, then the hand-off request processing, the path pre-establishment processing and the path establishment processing will be performed, next, multiple service flows processing will be triggered. During the handoff, the resource combination indication is transferred from a current serving network to a target network.

The foregoing resource combination indication may have the following three expressions: (1) a resource combination indication ID and a service flow ID are used cooperatively, i.e. information of all service flows is included in one message and meanwhile the binding ID of resource combination and the service flow ID are used cooperatively; (2) the multiple service flows in a binding relationship use the resource combination indication with a same ID, i.e. information of all service flows is included in one message, and the multiple service flows in a binding relationship use a same binding ID, to identify this group of service flows in a binding relationship; (3) respective resource combination indication is set respectively in information of each group of the service flows among the multiple service flows in a binding relationship, i.e. each group of the service flows among the multiple service flows in a binding relationship is set in one message, and indicates the binding relationship of this group of service flows in combination with the binding ID of the resource combination.

Step S304: hand-off request processing: when the multiple service flows of the MS is handed off from the current serving network to the target network, the target network will determine whether the MS is allowed to hand off to a target network according to the resource combination indication in the HO_Req message and whether the handoff of the multiple service flows is accepted by the target network.

Specifically, the serving network may send the HO_Req message to the target network after it receives a hand-off initiation message from the MS or after it itself initiates the handoff. When the resource combination indication included in the HO_Req message indicates the multiple service flows of the MS are bound, if some of the multiple service flows are rejected by the target network, then the target network may determine that the MS is allowed to hand off to a target network, at the moment, the target network sends a response message to the current serving network, and the response message omits some information needed for subsequent handoff procedures; the current serving network informs the MS of the candidate target networks to which the handoff will be performed, wherein the candidate target networks do not include the target network that rejects the MS; if non of the multiple service flows is rejected by the target network, the target network may determine that the MS is allowed to hand off to a target network.

Step S306: path pre-establishment processing: when it is allowed to hand off the multiple service flows of the MS from the current serving network to the target network, the target network or an anchor ASN may determine whether data paths between the target network and the anchor ASN can be pre-established according to the resource combination indication in the Path_Prereg_Req message and the availability of establishing data path pre-registration of the multiple service flows.

The step S306 may be executed in the hand-off preparation stage or in the handoff action stage, or may not be executed.

In the path pre-establishment processing, it may be the case that the target network sends the Path_Prereg_Req message to the anchor ASN, or the anchor ASN sends the Path_Prereg_Req message to the target network.

When the resource combination indication in the Path_Prereg_Req message indicates multiple service flows are bound with each other, if the network where the message receiver is located fails in processing the path pre-registration of some of the multiple service flows, the target network or the anchor ASN will determine that the pre-establishment of the data paths between the target ASN and the anchor ASN is not allowed, and will terminate the path pre-establishment processing; if the path pre-registration of each of the multiple service flows is successfully established, then the pre-establishment of the data paths will be allowed.

Step S308: path establishment processing: when it is allowed to hand off the multiple service flows of the MS from the current serving network to the target network and the path pre-registration processing is not performed, then the target network or the anchor ASN may determine whether data paths between the target network and the anchor ASN can be established according to the resource combination indication in the Path_Reg_Req message and availability of establishing data path registration of the multiple service flows.

From the above descriptions, it can be seen that during the hand-off request processing, the path pre-establishment processing and the path establishment processing, if service flows are bound with each other, then as long as one service flow is rejected or failed, the handoff, path pre-establishment and path establishment of other service flows binding with it will be failed, too.

Below the present invention will be described in connection with specific scenarios.

First, the hand-off preparation stage is described based on the network environment as shown in FIG. 1.

The hand-off scenario is that the target ASN initiates AK context acquisition and data path pre-registration. As shown in FIG. 1, without regard for other target ASNs, FIG. 1 only illustrates target ASN 1, so the description here is given only by taking the target ASN 1 for example. The processing of other target ASNs is similar to the processing of the target ASN 1.

Provided at least one service flow is rejected by the target ASN 1, the processing here under the foregoing scenario includes the following steps (step 11-step 17):

step 11: an MS sends an MOB_MSHO-REQ message to a serving ASN to initiate a handoff, this step is same as the step 11 in the prior art;

step 12: the serving ASN sends an HO_Req message to one or a plurality of target ASNs, the HO_Req message includes an authenticator ID and an anchor ASN GW ID as well as an ID that indicates whether multiple service flows are bound or not;

step 13: if the multiple service flows are identified as bound, then as long as one service flow is rejected by the target ASN 1, the target ASN 1 may determine based on the binding ID to reject all service flows of the MS, and there is no need to initiate a subsequent context request flow and the data path pre-establishment flow in step 14 to the target ASN 1; if the multiple service flows are not bound, then, same as the original flow, the target ASN 1 will initiate a context request flow to an authenticator ASN;

step 14: the target ASN 1 or the anchor ASN initiates a data path pre-establishment flow; if the multiple service flows are not bound, the processing will be same as the original flow;

step 15: the target ASN 1 sends an HO_Rsp message to the serving ASN to confirm the hand-off request; if the multiple service flows are identified as bound, the HO_Rsp message may not contain the following information: Data Path Info, HO ID, Service Level Prediction, HO Process Optimization, HO Authorization Policy Support, Action Time, and Data Integrity Info; BS HO RSP Code can be determined as handoff rejection;

step 16: the serving ASN sends an MOB_BSHO-RSP message to the MS, the message includes a potential target BS that is selected by one or a plurality of networks for the MS and that can be handed off to; if the multiple service flows are identified as bound, the foregoing target ASN 1 will not be included; and step 17: the serving ASN sends an HO_Ack to all target ASNs (candidate target ASNs) to which the potential target BS belongs to, if the multiple service flows are identified as bound, the candidate target ASNs will not include the foregoing target ASN 1.

Further, when the hand-off scenario is the AK context acquisition and the data path pre-registration initiated by the target ASN, if the multiple service flows of the MS originally is in a binding relationship, then after the MS is handed off from ASN a to ASN b, the default of the ASN b will be that the multiple service flows of the MS are not bound, for the previous hand-off message does not transfer the information about the multiple service flows of the MS being bound to the ASN b. When the MS hands off to the target network again in the ASN b, there will be the following flow in which the ASN b will be changed into the serving ASN accordingly.

Likewise, supposing at least one service flow is rejected by the target ASN 1, the following steps are included based on the network environment shown in FIG. 1:

step 11: same as the original flow, the MS sends the MOB_MSHO-REQ message to the serving ASN to initiate the handoff, this step is identical with the step 11 in the prior art;

step 12: the serving ASN sends the HO_Req message to one or a plurality of target ASNs; this message includes the authenticator ID and the anchor ASN GW ID; if the serving ASN does not acquire the information about the binding of multiple service flows from other network elements, then the HO_Req message will not include the ID indicating whether the multiple service flows are bound, and the default is non-bound;

step 13: as long as one service flow is rejected by the target ASN 1, the target ASN 1 will reject all service flows of the MS because of the binding relationship among the multiple service flows of the MS, and there will be no need to initiate the subsequent context request flow and the data path pre-establishment flow in step 14 to the target ASN 1, i.e. directly turning to step 15; as the information of this binding relationship was lost in the previous handoff, the default of the serving ASN in the current handoff is that the multiple service flows of the MS are not bound, and thus the serving ASN enters wrong processing. Same as the original flow under the protocol, the target ASN 1 initiates the context request flow to the authenticator ASN and turns to step 14;

step 14: the target ASN 1 or the anchor ASN initiates the data path pre-establishment flow; if the multiple service flows are not bound, the processing will be same as the original flow;

step 15: the target ASN 1 sends the HO_Rsp message to the serving ASN to confirm the hand-off request; according to the binding relationship of the multiple service flows of the MS, the HO_Rsp message may not contain the following information needed for subsequent hand-off procedures: Data Path Info, HO ID, Service Level Prediction, HO Process Optimization, HO Authorization Policy Support, Action Time and Data Integrity Info; the BS HO RSP Code can be determined as hand-off rejection; however, as the information about this binding relationship was lost in the previous hand-off, the default of the serving ASN in the current handoff is that the multiple service flows of the MS are not bound, same as the original flow, the information included in the message is same as that in the original flow;

step 16: the serving ASN sends the MOB_BSHO-RSP message to the MS, the message includes the potential target BS that is selected by one or a plurality of networks for the MS and can be handed off to; if the multiple service flows of the MS are in a binding relationship, the message will not include the foregoing target ASN 1; however, as the information of this binding relationship was lost in the previous handoff, the default of the serving ASN in the current handoff is that the multiple service flows of the MS are not bound, therefore, this message may contain the foregoing target ASN 1; and step 17: the serving ASN sends the HO_Ack to the potential ASN where the target BS is located, the potential target ASN may include the foregoing target ASN 1.

The processing in the hand-off action stage will be described hereinafter based on the network environment as shown in FIG. 2. Provided the hand-off scenario is that the serving ASN sends an HO_Cnf message to the target ASN, data path granularity is one service flow, and the multiple service flows in the data path request (Path_Prereg_Req/Path_Reg_Req) are in a binding relationship. The following steps (step 201-step 211) are included:

step 201: the MS sends an MOB_HO-IND message to the serving ASN to inform it that the handoff has been performed to one of the target ASNs selected by the serving ASN;

step 202: after the serving ASN receives the MOB_HO-IND message, it will send an HO_Cnf message to the selected target ASN;

step 203: the selected target ASN sends an HO_Ack message to the serving ASN;

step 204: if the HO_Req or the HO_Cnf message contains an authenticator ID field and in the previous handoff preparation stage, the AK context of the corresponding MS is not acquired, then the selected target ASN will initiate a context request flow to the authenticator ASN and request the AK context for the MS;

step 205: if the data path pre-registration flow occurs in the hand-off action stage, according to the embodiment of the present invention, if the binding ID of the multiple service flows in the Path_Prereg_Req indicates a binding relationship and the data path establishment of at least one service flow is failed, then the target ASN or the anchor ASN will inform the other party of the failure of the data path pre-registration establishment in the Path_Prereg_Rsp message, moreover, even if SF Info in the Path_Prereg_Req and response messages contains a Data Delivery Trigger field, the distribution of any service flow of the MS will not be triggered; if the pre-establishment of the data path is successful, then the following processing will be executed;

step 206: the MS initiates a flow of reaccessing the target ASN;

step 207: the target ASN initiates a data path registration flow to the anchor ASN; when data path granularity is one service flow and the multiple service flows in the Path_Reg_Req are bound, if the data path pre-registration is not performed before the data paths is established, then a three-party handshake data path establishment flow will start: when the data path establishment of any service flow is rejected, if the binding ID of the multiple service flows in the Path_Reg_Req indicates a binding relationship, then the anchor ASN will inform the target ASN in the Path_Reg_Rsp message that the data path registration establishment is failed;

step 208: after the network reaccess is completed with success, the target ASN will initiate a CMAC key count updating flow;

step 209: after the network reaccess is completed with success, the target ASN will send an HO_Complete message to the serving ASN to inform it of hand-off completion; and step 210-211: after the data paths between the anchor ASN and the target ASN is established, the anchor ASN may initiate a deregistration flow to the previous serving ASN.

Embodiment 2

Figure 4:
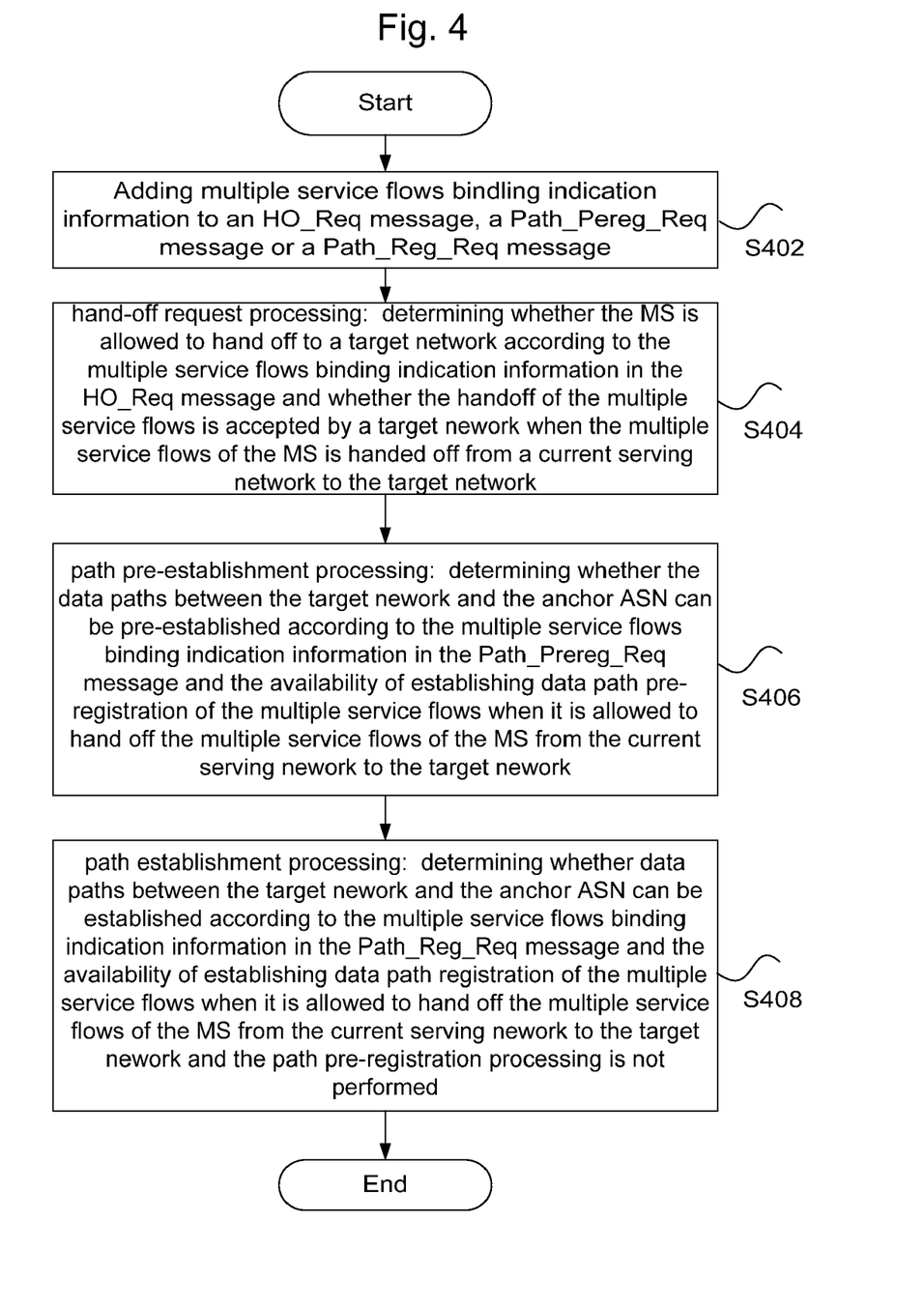
FIG. 4 is a flow chart of an optimization method of multiple service flows operation for a WiMAX system according to Embodiment 2 of the present invention.

In the embodiment of the present invention, an optimization method of multiple service flows operation for a WiMAX system is provided. FIG. 4 is a flow chart of this optimization method. As shown in FIG. 4, this method includes the following steps (step S402-step S408):

step S402: multiple service flows binding indication information is added to an HO_Req message, a Path_Prereg_Req message or a Path_Reg_Req message, where the information is used to indicate whether the multiple service flows of a MS are bound with each other;

step S404: hand-off request processing: determining whether the MS is allowed to hand off to a target network according to the multiple service flows binding indication information in the HO_Req message and whether the handoff of the multiple service flows is accepted by a target network when the multiple service flows of the MS is handed off from a current serving network to the target network;

step S406: path pre-establishment processing: determining whether the data paths between the target network and the anchor ASN can be pre-established according to the multiple service flows binding indication information in the Path_Prereg_Req message and the availability of establishing data path pre-registration of the multiple service flows when it is allowed to hand off the multiple service flows of the MS from the current serving network to the target network; and step S408: path establishment processing: determining whether data paths between the target network and the anchor ASN can be established according to the multiple service flows binding indication information in the Path_Reg_Req message and the availability of establishing data path registration of the multiple service flows when it is allowed to hand off the multiple service flows of the MS from the current serving network to the target network and the path pre-registration processing is not performed.

Preferably, the foregoing multiple service flows binding indication information may be the resource combination indication in the foregoing Embodiment 1.

From the above descriptions, it can be seen that the step S404-step S408 are similar to the foregoing step S304-step S308, so they are not described again here; besides, what is different from Embodiment 1 is that the multiple service flows binding indication information here is included in the HO_Req message, the Path_Prereg_Req message or the Path_ Reg_Req message.

Those skilled in the art shall understand that in addition to the scenarios described above, the present invention is also applicable to other application scenarios in the hand-off preparation stage, for example, the scenario under which AK context is sent by the serving ASN and the target ASN initiates data path pre-registration; the scenario under which the anchor ASN and the serving ASN are jointly configured and R4 (Reference point 4) data path pre-registration is initiated by the anchor ASN/serving ASN; the scenario under which the anchor ASN and the serving ASN are jointly configured and the data path pre-registration message is sent after being combined into a hand-off control message; and the scenario under which the handoff is initiated by a network, etc.

Moreover, the handoff initiated by a network is initiated by the serving ASN or the serving ASN/authenticator ASN (when jointly configured).

It should be noted that under the foregoing scenarios, unless otherwise specified that the handoff is initiated by a network, the handoff is always initiated by an MS.

It can be seen without difficulty that through adding the resource combination indication, the target network can directly make a judgment on the hand-off request of the multiple service flows, other than acquire resource combination information from the network element where the information is kept, or transfer hand-off request information to this network element to make a judgement. Therefore, it saves the resource cost arising from relative information interaction and meanwhile guarantees the integral transfer of the original service flow binding information.

Besides, in addition to the foregoing scenarios in the hand-off action stage, the present invention is also applicable to other scenarios in the hand-off action stage, for example, the target ASN does not receive the HO_Cnf from the R4 (Reference point 4); the serving ASN does not receive the MOB_MSHO-REQ message; the anchor ASN, the authenticator ASN and the serving ASN are jointly configured, and the serving ASN initiates the path registration, etc.

Through providing an option for the target network to making a judgment on service flow binding operation, the technical scheme of the present invention overcomes the shortcomings of the prior art under the condition of multiple service flows, meanwhile, guarantees the integrity of the original service flow binding information after the MS hands off to the target network and avoids multiple service flows processing errors that might arise therefrom.

It is obvious that, those skilled in the art should understand that the foregoing modules or steps of the present invention may be realized by general computing devices, e.g. being integrated into a single computing device or being distributed in network consisting of a plurality of computing devices, alternatively, the modules or steps can be realized by program codes executable to the computing devices, thereby they can be stored in memory devices and executed by the computing devices, or they can be realized by being made into respective integrated circuit modules, or by making multiple modules or steps among them into a single integrated circuit module. In this way, the present invention is not limited to any particular combination of hardware and software.

The foregoing descriptions are just preferred embodiments of the present invention and are not used to limit the present invention. For those skilled in the art, various changes and modifications may be made on the present invention. Any modification, equivalent substitute and improvement without departing from the spirit and principle of the present invention shall be included within the protection scope of the present invention.

What is claimed is:

1. An optimization method of multiple service flows operation for a WiMAX system, including:

adding a resource combination indication to a handoff request message, a path pre-registration request message and a path registration request message, wherein the resource combination indication is used to indicate whether multiple service flows of a mobile station (MS) are bound with each other;

hand-off request processing: determining whether the MS is allowed to hand off to a target network according to the resource combination indication in the hand-off request message and whether the handoff of the multiple service flows is accepted by the target network when the multiple service flows of the MS is handed off from a current serving network to the target network;

path pre-establishment processing: determining whether data paths between the target network and a network where a data management unit is located (anchor ASN) can be pre-established according to the resource combination indication in the path pre-registration request message and the availability of establishing data path pre-registration of the multiple service flows when it is allowed to hand off the multiple service flows of the MS from the current serving network to the target network; and path establishment processing: determining whether the data paths between the target network and the anchor ASN can be established according to the resource combination indication in the path registration request message and the availability of establishing data path registration of the multiple service flows when it is allowed to hand off the multiple service flows of the MS from the current serving network to the target network and the path pre-registration processing is not performed.

2. The optimization method according to claim 1, wherein, in the hand-off request processing, it further includes:

the MS initiates the handoff to the current serving network or the current serving network initiates the handoff;

the current serving network sends the hand-off request message to the target network; and when the resource combination indication in the hand-off request message indicates the multiple service flows of the MS are bound, if some of the multiple service flows are rejected by the target network, then the target network will determine that the MS is not allowed to hand off to the target network; if none of the multiple service flows is rejected by the target network, then the target network will determine that the MS is allowed to hand off to the target network.

3. The optimization method according to claim 2, wherein, when the MS is not allowed to hand off to the target network, it further includes:
   the target network sends a response message to the current serving network and the response message omits some information needed for subsequent handoff procedures; and
   the current serving network informs the MS of candidate target networks to which the handoff will be performed, wherein the candidate target networks do not include the target network that rejects the MS.

4. The optimization method according to claim 1, wherein, in the path pre-establishment processing, it further includes:
   the target network sends the path pre-registration request message to the anchor ASN, or the anchor ASN sends the path pre-registration request message to the target network; and
   when the resource combination indication in the path pre-registration request message indicates the multiple service flows are bound with each other, if the target network or the anchor ASN fails in processing the path pre-registration of some of the multiple service flows, then the target network or the anchor ASN will determine that the pre-establishment of the data paths between the target network and the anchor ASN is not allowed, and will terminate the path pre-establishment processing; if path pre-registration of all of the multiple service flows is successfully established, then the pre-establishment of the data paths will be allowed.

5. The optimization method according to claim 1, wherein, in the path establishment processing, it further includes:
   the target network sends the path registration request message to the anchor ASN; and
   when the resource combination indication in the path registration request message indicates the multiple service flows are bound with each other and the path pre-registration is not performed, if the anchor ASN fails in processing the path registration of some of the multiple service flows, then the anchor ASN will determine that the establishment of the data paths between the target network and the anchor ASN is not allowed, and will terminate the path establishment processing; if the path registration of all of the multiple service flows is successfully established, then the establishment of the data paths between the target network and the anchor ASN will be allowed.

6. The optimization method according to claim 1, wherein, it further includes:
   the resource combination indication that indicates the binding relationship among the multiple service flows of the MS is transferred from the current serving network to the target network during the handoff.

7. The optimization method according to claim 1, wherein, the expressions for the resource combination indication include at least one of the following:
   a resource combination indication ID and a service flow ID are used cooperatively;
   the multiple service flows in a binding relationship use the resource combination indication with a same ID; and
   the respective resource combination indications are set respectively in information of each group of service flows among the multiple service flows for the binding relationship.

8. The optimization method according to claim 1, wherein, if the resource combination indication in the hand-off request message, the path pre-registration request message and the path registration request message indicates the multiple service flows are not bound with each other, then the hand-off request processing, the path pre-establishment processing and the path establishment processing will be performed and next, processing of the multiple service flows will be triggered.

9. The optimization method according to claim 1, wherein, the resource combination indication includes a resource combination requirement and a convergence sublayer type.

10. The optimization method according to claim 9, wherein, the convergence sublayer type is used to indicate the scope of the multiple service flows bound by the resource combination requirement.

11. An optimization method of multiple service flows operation for a WiMAX system, including:
    adding multiple service flows binding indication information to a hand-off request message, a path pre-registration request message or a path registration request message, wherein the information is used to indicate whether multiple service flows of a mobile station (MS) are bound with each other;
    hand-off request processing: determining whether the MS is allowed to hand off to the target network according to the multiple service flows binding indication information in the hand-off request message and whether the handoff of the multiple service flows is accepted by a target network when the multiple service flows of the MS is handed off from a current serving network to the target network;
    path pre-establishment processing: determining whether data paths between the target network and a network where a data management unit is located (anchor ASN) can be pre-established according to the multiple service flows binding indication information in the path pre-registration request message and the availability of establishing data path pre-registration of the multiple service flows when it is allowed to hand off the multiple service flows of the MS from the current serving network to the target network; and
    path establishment processing: determining whether the data paths between the target network and the anchor ASN can be established according to the multiple service flows binding indication information in the path registration request message and the availability of establishing data path registration of the multiple service flows when it is allowed to hand off the multiple service flows of the MS from the current serving network to the target network and the path pre-registration processing is not performed.

12. The optimization method according to claim 2, wherein, if the resource combination indication in the hand-off request message, the path pre-registration request message and the path registration request message indicates the multiple service flows are not bound with each other, then the hand-off request processing, the path pre-establishment processing and the path establishment processing will be performed and next, processing of the multiple service flows will be triggered.

13. The optimization method according to claim 3, wherein, if the resource combination indication in the hand-off request message, the path pre-registration request message and the path registration request message indicates the multiple service flows are not bound with each other, then the hand-off request processing, the path pre-establishment processing and the path establishment processing will be performed and next, processing of the multiple service flows will be triggered.

14. The optimization method according to claim 4, wherein, if the resource combination indication in the hand-off request message, the path pre-registration request message and the path registration request message indicates the multiple service flows are not bound with each other, then the hand-off request processing, the path pre-establishment processing and the path establishment processing will be performed and next, processing of the multiple service flows will be triggered.

15. The optimization method according to claim 5, wherein, if the resource combination indication in the hand-off request message, the path pre-registration request message and the path registration request message indicates the multiple service flows are not bound with each other, then the hand-off request processing, the path pre-establishment processing and the path establishment processing will be performed and next, processing of the multiple service flows will be triggered.

16. The optimization method according to claim 6, wherein, if the resource combination indication in the hand-off request message, the path pre-registration request message and the path registration request message indicates the multiple service flows are not bound with each other, then the hand-off request processing, the path pre-establishment processing and the path establishment processing will be performed and next, processing of the multiple service flows will be triggered.

17. The optimization method according to claim 7, wherein, if the resource combination indication in the hand-off request message, the path pre-registration request message and the path registration request message indicates the multiple service flows are not bound with each other, then the hand-off request processing, the path pre-establishment processing and the path establishment processing will be performed and next, processing of the multiple service flows will be triggered.

18. The optimization method according to claim 2, wherein, the resource combination indication includes a resource combination requirement and a convergence sublayer type.

19. The optimization method according to claim 3, wherein, the resource combination indication includes a resource combination requirement and a convergence sublayer type.

20. The optimization method according to claim 4, wherein, the resource combination indication includes a resource combination requirement and a convergence sublayer type.

21. The optimization method according to claim 5, wherein, the resource combination indication includes a resource combination requirement and a convergence sublayer type.

22. The optimization method according to claim 6, wherein, the resource combination indication includes a resource combination requirement and a convergence sublayer type.

23. The optimization method according to claim 7, wherein, the resource combination indication includes a resource combination requirement and a convergence sublayer type.

24. The optimization method according to claim 18, wherein, the convergence sublayer type is used to indicate the scope of the multiple service flows bound by the resource combination requirement.

25. The optimization method according to claim 19, wherein, the convergence sublayer type is used to indicate the scope of the multiple service flows bound by the resource combination requirement.

26. The optimization method according to claim 20, wherein, the convergence sublayer type is used to indicate the scope of the multiple service flows bound by the resource combination requirement.

27. The optimization method according to claim 21, wherein, the convergence sublayer type is used to indicate the scope of the multiple service flows bound by the resource combination requirement.

28. The optimization method according to claim 22, wherein, the convergence sublayer type is used to indicate the scope of the multiple service flows bound by the resource combination requirement.

29. The optimization method according to claim 23, wherein, the convergence sublayer type is used to indicate the scope of the multiple service flows bound by the resource combination requirement.

* * * * *